(12) United States Patent
Wang et al.

(10) Patent No.: US 8,015,576 B2
(45) Date of Patent: Sep. 6, 2011

(54) OPTICAL DISK DRIVE WITH PROTECTION DESIGN AGAINST BROKEN DISK

(75) Inventors: Wen-Hong Wang, Hsinchu (TW); Cheng-Ho Tien, Hsinchu (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 388 days.

(21) Appl. No.: 12/416,287

(22) Filed: Apr. 1, 2009

(65) Prior Publication Data

US 2010/0083293 A1    Apr. 1, 2010

(30) Foreign Application Priority Data

Sep. 27, 2008 (CN) .......................... 2008 1 0168920

(51) Int. Cl.
*G11B 33/02* (2006.01)
(52) U.S. Cl. ...................................... 720/647; 720/646
(58) Field of Classification Search .................. 720/647
See application file for complete search history.

*Primary Examiner* — Ly D Pham
(74) *Attorney, Agent, or Firm* — Thomas, Kayden, Horstemeyer & Risley, LLP

(57) ABSTRACT

An optical disk drive with a protection design against a broken disk comprises the following devices of: a chassis; an upper cover mounted above the chassis; a tray mounted between the chassis and the upper cover for supporting an optical disk; a faceplate mounted on the front end of the upper cover and having a first inclined plane; a door mounted on the front end of the tray and having a second inclined plane with a gap opposite to the first inclined plane for forming an inclined directed channel between the faceplate and the door.

9 Claims, 3 Drawing Sheets

OPTICAL DISK DRIVE WITH PROTECTION DESIGN AGAINST BROKEN DISK

FIELD OF THE INVENTION

The present invention relates to an optical disk drive, and more particularly to an optical disk drive capable of preventing the broken disk from flying to the outside by forming an inclined directed channel between the faceplate and the door of the optical disk drive or mounting a double-layered retaining plate behind the door to effectively decrease the impact force from the broken disk for protecting the consumer from being injured by the broken disk that damages the faceplate and flies to the outside of the optical disk drive.

BACKGROUND OF THE INVENTION

The advance of electronic-mechanical related technologies consequently results in swift improvement in the peripheral accessories, such as hard disk drives, optical disk drives, scanning machines, and printing machines. As for the optical disk drive, a commercial optical disk is an inevitable storage medium at present since it is cheap and capable of storing up to several GBs of music or image data for a long time. The BD (Blu-ray Disc) of the new generation even has a storage capacity of several tens of GBs such that the optical disk drive plays an even more important role in data storage.

For the purpose of further improving the data access rate of the optical disk drive, the optical disk drive of new generation generally has higher rotation speed so as to shorten the reading/writing time for the data. For instance, the optical disk of the 20X DVD (Digital Versatile Disk) rotates 10000 RPM (Revolutions per minute). Under such high speed, the centrifugal force suffered by the optical disk during the rotation of the optical disk is relatively large, resulting in the easy breaking of the optical disk that rotates in high speed. Note that, the optical disk is mainly made of plastic material, which is natively fragile. Therefore, the cracks occur easily on the supported central portion of the optical disk during the high-speed rotation of the optical disk in the optical disk drive, causing the burst of the optical disk. In addition, deficiencies, such as bubbles on the surface, uneven coating on the surface, wrap of the optical disk, eccentric disk, and so forth, may also occur during the manufacture of the optical disk. The imperfect optical disk has a higher probability of occurring breaking during its high-speed rotation and its broken pieces cause larger impact force.

Please refer to FIG. 1, a conventional optical disk drive with a protection design against a broken disk is shown. The tray 10 of the optical disk drive is retractable upon pressing of the on/off button of the optical disk drive 1 to allow the consumer to place or take out the optical disk. After putting the optical disk on the upper surface of the tray 10, the consumer can press the on/off button again to retract the tray 10 into the optical disk drive 1. In addition, a door 100 is mounted on the front end of the tray 10. When the tray 10 is retracted into the optical disk drive 1, the door 100 is roughly aligned with the faceplate 12 of the optical disk drive 1. It is worthy to note that the door 100 and the faceplate 12 are both made of plastic material. Therefore, when the breaking of the optical disk occurs, the flying broken disk may hit and damage the door 100 and the faceplate 12. Especially, under the influence of centrifugation created by the high-speed rotation, the flying force of the broken disk is considerably large so it may destroy the structure of the door 100 and the faceplate 12 and fly to the outside of the optical disk drive 1, causing injury to the consumer.

Please refer to FIG. 1, for the purpose of shielding the broken disk, a bended part 140 is formed on the front end of a conventional iron upper cover 14 to prevent the broken disk from hitting the faceplate 12 and the door 100 directly and perpendicularly. The iron upper cover 14 is able to resist the broken disk that have larger impact force since the iron upper cover 14 has a higher strength.

However, it is worthy to mention that the iron upper cover 14 is made of rigid material so it has a limited ability to retard the flying of the broken disk. In addition, after hitting the bended part 140, the broken disk will be rebounded therefrom to hit and damage other components inside the optical disk drive 1. In addition, a gap S with a value about 1.0 cm inevitably exists between the tray 10 and the bended part 140 of the iron upper cover 14 for preventing the bended part 140 from hindering the optical disk when the tray 10 moves into or out of the optical disk drive 1. However, the smaller pieces of the broken disk may therefore pass through the gap S and destroy the structure of the door 100 and the faceplate 12 in such a manner that the pieces flies to the outside of the optical disk drive 1 after deforming the faceplate 12.

Please refer to FIG. 2, an optical disk drive with another conventional protection design against broken disk is shown. Instead of having a bended part 140 on the front end of the iron upper cover 14, the design shown in FIG. 2 provides an inclined retaining block 16 on the inside surface of the faceplate 12 to shield the broken disk. The inclined retaining block 16 provides better effect on buffering the impact force from the broken disk since it is made of plastic material or other soft material. In addition, the impact direction of the broken disk can be changed by the inclined surface of the inclined retaining block 16 in such a manner that the broken disk is scattered to the tray 10, the faceplate 12 and door 100 along the inclined surface of the inclined retaining block 16 as indicated by the arrow in FIG. 2. However, as described above, it is worthy to note that a gap S with a value about 1.0 cm still inevitably exists between the tray 10 and the inclined retaining block 16 to prevent the inclined retaining block 16 from hindering the optical disk and the tray 10 from moving into or out of the optical disk drive 1. However, the larger piece of the broken disk may pass through the gap S and may hit or destroy the structures of the door 100 and the faceplate 12 in such a manner that the piece even flies to the outside of the optical disk drive 1. Therefore, it is an important task in developing and designing the high-speed optical disk drive to provide a safer design to prevent the broken disk from flying to the outside of the optical disk drive.

SUMMARY OF THE INVENTION

The present invention provides an optical disk drive with a protection design against a broken disk. The optical disk drive mainly comprises a chassis; an upper cover mounted above the chassis; a tray mounted between the chassis and the upper cover for supporting an optical disk; a faceplate having a first inclined plane, and mounted on a front end of the upper cover; and a door mounted on a front end of the tray and having a second inclined plane with a gap opposite to the first inclined plane for forming an inclined directed channel between the faceplate and the door.

In one preferred embodiment, the gap has a value from 1.0 to 1.4 cm. Moreover, the faceplate further comprises a first vertical surface connected with an upper edge of the first inclined plane, and the door comprises a second vertical surface opposite to the first vertical surface and connected with an upper edge of the second inclined plane.

In one preferred embodiment, a bended part is formed on a front end of the upper cover, and a space is formed between the bended part and the faceplate. In addition, the optical disk drive further comprises a first retaining plate located in the space between the bended part and the faceplate. The door further comprises a horizontal surface connected to a lower edge of the second inclined plane, and wherein a horizontal channel is formed between a lower surface of the first retaining plate and the horizontal surface to communicate with the inclined directed channel. The horizontal channel has a height from 1.0 cm to 1.4 cm. The optical disk drive further comprises a second retaining plate located behind the first retaining plate and the bended part, wherein the first retaining plate and the second retaining plate are connected to each other and integrally formed to form a double-layered retaining structure.

In another preferred embodiment, the optical disk drive of the present invention mainly comprises a chassis; an upper cover mounted above the chassis, and having a bended part on a front end thereof, a tray mounted between the chassis and the upper cover for supporting an optical disk; a faceplate mounted on the front end of the upper cover, wherein the bended part is located behind the faceplate and a space is formed between the bended part and the faceplate; a door mounted on a front end of the tray; and a double-layered retaining plate having a first retaining plate and a second retaining plate located respectively on both front and rear sides of the bended part. The first retaining plate is located in the space between the bended part and the faceplate. The second retaining plate is located on the read side of the bended part, and the second retaining plate and the first retaining plate are integrally formed to connect to each other.

DESCRIPTION OF THE PREFERRED EMBODIMENT

Figure 1:
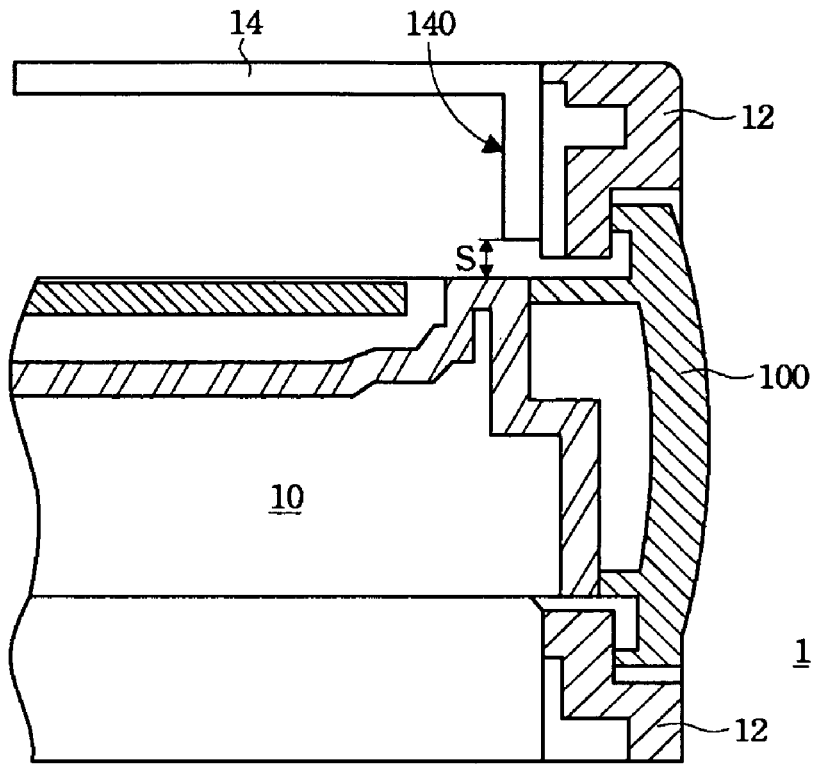
FIG. 1 shows an optical disk drive with a conventional protection design against a broken disk.
Figure 2:
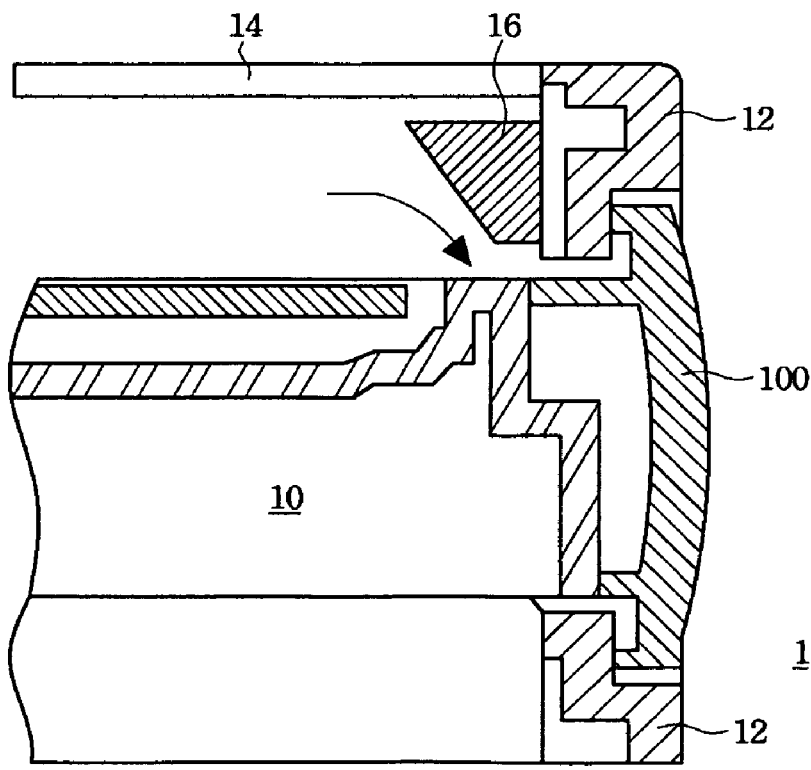
FIG. 2 shows an optical disk drive with another conventional protection design against a broken disk.
Figure 3:
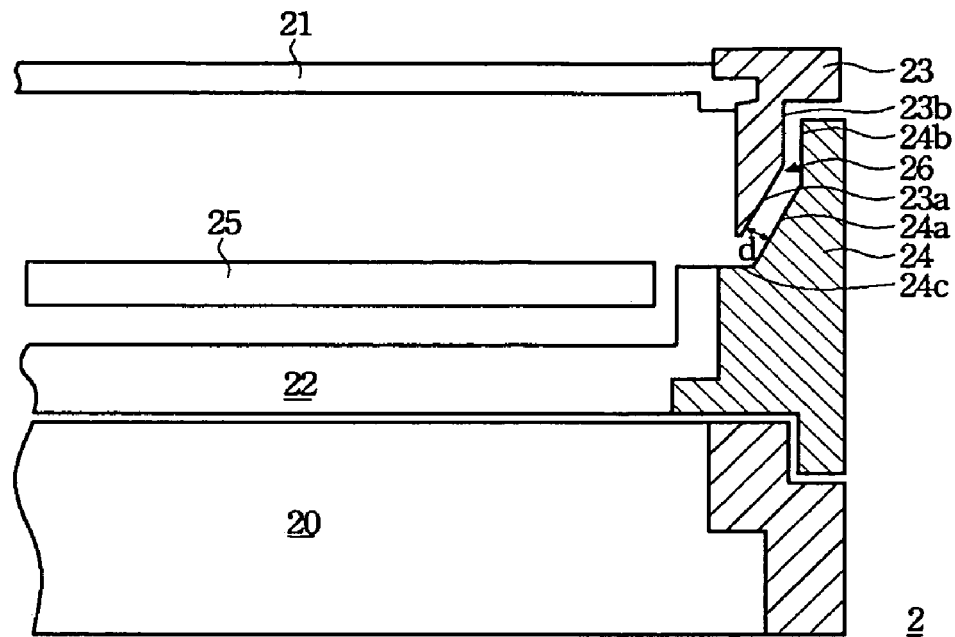
FIG. 3 is a cross-sectional view showing an optical disk drive with a protection design against a broken disk in accordance with a first preferred embodiment of the present invention.

Please refer to FIG. 3, a cross-sectional view of an optical disk drive with a protection design against a broken disk in accordance with a first preferred embodiment of the present invention is shown. As can be seen from this figure, an optical disk drive 2 mainly comprises a chassis 20, an upper cover 21, a tray 22, a faceplate 23, and a door 24. The chassis 20 is designed for holding a traverse module of the optical disk drive, which has a spindle motor to rotate an optical disk 25 and a read/write head for reading data from or writing data into the optical disk. The aforementioned upper cover 21 is mounted above the chassis 20 for shielding and protecting the components inside the optical disk drive 2. The tray 22 is mounted between the chassis 20 and the upper cover 21, and located above the traverse module for supporting the optical disk 25.

The faceplate 23 is mounted on the front end of the upper cover 21 and it has a first inclined plane 23a and a first vertical surface 23b. The first vertical surface 23b is connected with the upper edge of the first inclined plane 23a. The door 24 is mounted on the front end of the tray 22, and it has a second inclined plane 24a, a second vertical surface 24b, and a horizontal surface 24c. The second inclined plane 24a of the door 24 is located oppositely to the first inclined plane 23a of the faceplate 23 in such a manner that a gap d is formed therebetween thereby forming an inclined directed channel 26 between the faceplate 23 and the door 24. The second vertical surface 24b of the door 24 is connected with the upper edge of the second inclined plane 24a and it is located oppositely to the first vertical surface 23b of the faceplate 23. The horizontal surface 24c of the door 24 is connected to the lower edge of the second inclined plane 24a. In one preferred embodiment, the gap d formed between the second inclined plane 24a and the first inclined plane 23a has a value from 1.0 cm to 1.4 cm.

As described above, if the optical disk 25 breaks during its high-speed rotation, the broken disk may hit and damage the faceplate 23 or the door 24 directly, or it may hit the door 24 directly along the gap between the faceplate 23 and the door 24 or even fly to the outside by piercing through the door 24. However, as the optical disk device of the present invention shown in FIG. 3, an inclined directed channel 26 is formed between the faceplate 23 and the door 24. Therefore, when the high-speed broken disk flies into the gap d between the faceplate 23 and the door 24, it will be guided by the second inclined plane 24a of the door 24 to go up along the inclined directed channel 26 so as to prevent the high-speed broken disk from hitting the surface of the door 24 perpendicularly. The inclined directed channel 26 is capable of dispersing the impact force from the broken disk and retarding its speed so the broken disk that losses the kinetic energy will be retained in the inclined directed channel 26 to such an extent as not to deform or damage the door 24, thereby further preventing the broken disk from piercing through the door 24 directly and from flying to the outside.

Figure 4:
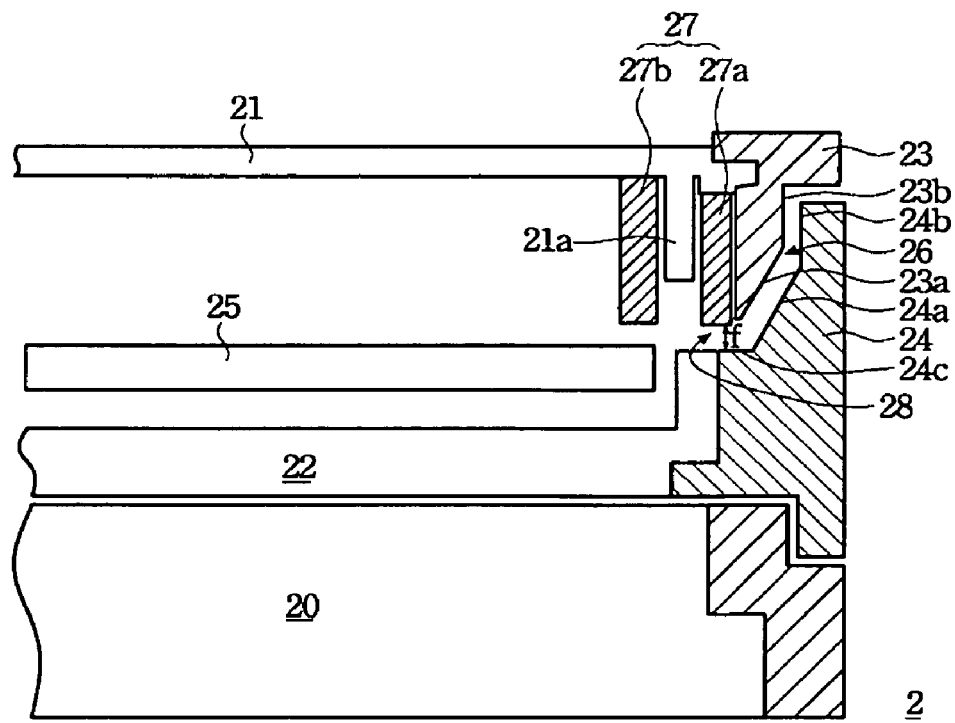
FIG. 4 is a cross-sectional view showing an optical disk drive with a protection design against a broken disk in accordance with a second preferred embodiment of the present invention.

Please refer to FIG. 4, a cross-sectional view of an optical disk drive with a protection design against a broken disk in accordance with a second preferred embodiment of the present invention is shown. As described above, the optical disk drive 2 mainly comprises a chassis 20, an upper cover 21, a tray 22, a faceplate 23, and a door 24. And, a gap d is formed between a first inclined plane 23a of the faceplate 23 and a second inclined plane 24a of the door 24 for forming an inclined directed channel 26 between the faceplate 23 and the door 24. The above-mentioned gap d has a value from 1.0 cm to 1.4 cm. Therefore, when the broken disk flies toward the gap d between the faceplate 23 and the door 24, it will be guided by the second inclined plane 24a of the door 24 to go up along the inclined directed channel 26 and jammed in the inclined directed channel 26.

It is worthy to note that in the second preferred embodiment, a bended part 21a bending toward the upper surface of the tray 22 is formed on the front end of the upper cover 21, wherein a space is further formed between the bended part 21a and the faceplate 23. The upper cover 21 can be made of iron so the bended part 21a has a larger strength to shield off the flying broken disk effectively and to prevent the broken disk from hitting the faceplate 23 and the door 24 directly.

However, as described above, the upper cover 21 is made of rigid material so it provides limited ability to retard the flying broken disk. Therefore, in order to prevent the broken disk that has hit the bended part 21a from rebounding to hit the components inside the optical disk drive 2 again, a double-layered retaining plate 27 can be further mounted on the chassis 20 in accordance with this preferred embodiment. This double-layered retaining plate 27 has a first retaining plate 27a and a second retaining plate 27b, which are integrally formed and connected to each other, wherein the first retaining plate 27a is exactly located in the space formed between the bended part 21a and the faceplate 23, and the second retaining plate 27b is located behind the first retaining plate 27a and the bended part 21a. In other words, the bended part 21a of the upper cover 21 is located exactly between the first retaining plate 27a and the second retaining plate 27b.

The double-layered retaining plate 27 can be made of soft material such as plastics, hence when the broken disk hits the second retaining plate 27b, the second retaining plate 27b can considerably decrease the impact force from the broken disk to avoid the rebounded broken disk from damaging the components inside the optical disk drive 2. Furthermore, even if the broken disk has such excessively large impact force to an extent as to pierce through or damage the second retaining plate 27b, the broken disk that pierces through the second retaining plate 27b will still be retained by the bended part 21a since the bended part 21a of the upper cover 21 is located in front of the second retaining plate 27b.

In addition, if the broken disk flies along the space under the second retaining plate 27b, the broken disk will be retained by the first retaining plate 27a, which is located more inside than the faceplate 23, such that the faceplate 23 is protected from being hit directly by the broken disk. In other words, even if the broken disk proceeds along the space under the second retaining plate 27b and the bended part 21a, the first retaining plate 27a still can decrease the impact force of the broken disk so as to prevent the broken disk from directly hitting and damaging the faceplate 23.

As shown in the figure, a horizontal channel 28 is formed between the lower surface of the first retaining plate 27a and the horizontal surface 24c of the door 24 to communicate with the inclined directed channel 26 directly. In one preferred embodiment, the horizontal channel 28 has a height f of from 1.0 cm to 1.4 cm so as to prevent the first retaining plate 27a from hindering or jamming the optical disk 25 when the tray 22 moves in and out of the optical disk drive 2.

Figure 5:
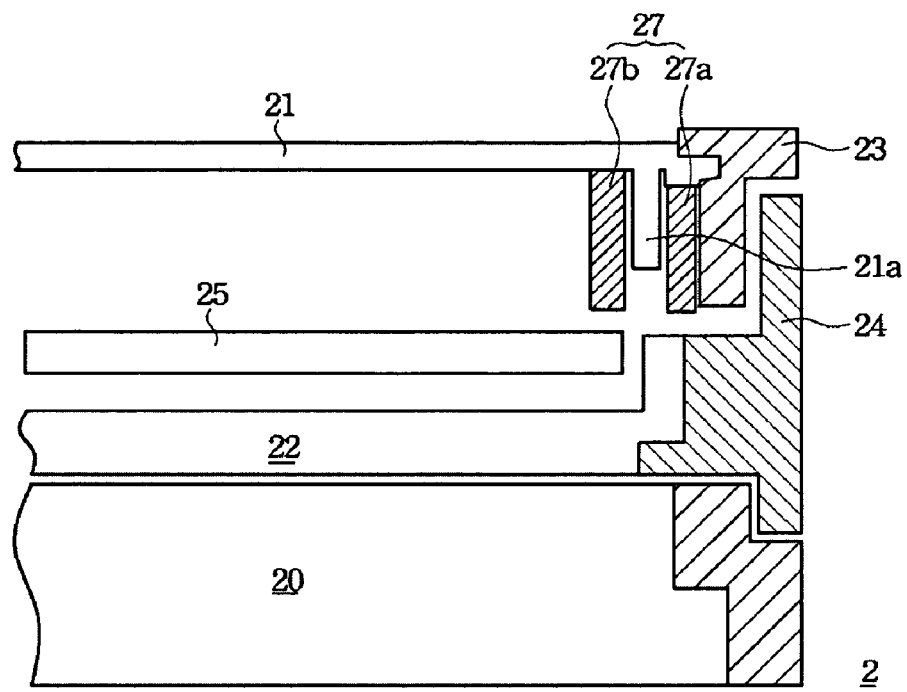
FIG. 5 is a cross-sectional view showing an optical disk drive with a protection design against a broken disk in accordance with a third preferred embodiment of the present invention.

It is specially noted that even though the inclined directed channel 26 disclosed in the first preferred embodiment is combined with the bended part 21a of the upper cover 21 and the double-layered retaining plate 27 disclosed in the second preferred embodiment, the bended part 21a of the upper cover 21 and the double-layered retaining plate 27 can be utilized alone to prevent the flying broken disk from damaging the faceplate 23 of the optical disk drive upon design requirement of the optical disk drive. Please refer to FIG. 5, a cross-sectional view of an optical disk drive with a protection design against a broken disk in accordance with a third preferred embodiment of the present invention is shown. As described above, the optical disk drive 2 mainly comprises the chassis 20, the upper cover 21, the tray 22, the faceplate 23, and the door 24. It is worthy to note that instead of utilizing the inclined directed channel 26 disclosed in the aforementioned first and second preferred embodiments, the optical disk drive 2 disclosed in this preferred embodiment has a bended part 21a extending downward vertically from the upper cover 21 and a double-layered retaining plate 27 mounted on the chassis 20 so that the first retaining plate 27a of the double-layered retaining plate 27 is located in the space between the bended part 21a and the faceplate 23 and that the second retaining plate 27b is located behind the first retaining plate 27a and the bended part 21a. As a result, the high strength retaining structure and the soft structure capable of decreasing the impact force of the broken disk can be simultaneously provided by mounting the rigid bended part 21a between the soft first retaining plate 27a and second retaining plate 27b.

Figure 6:
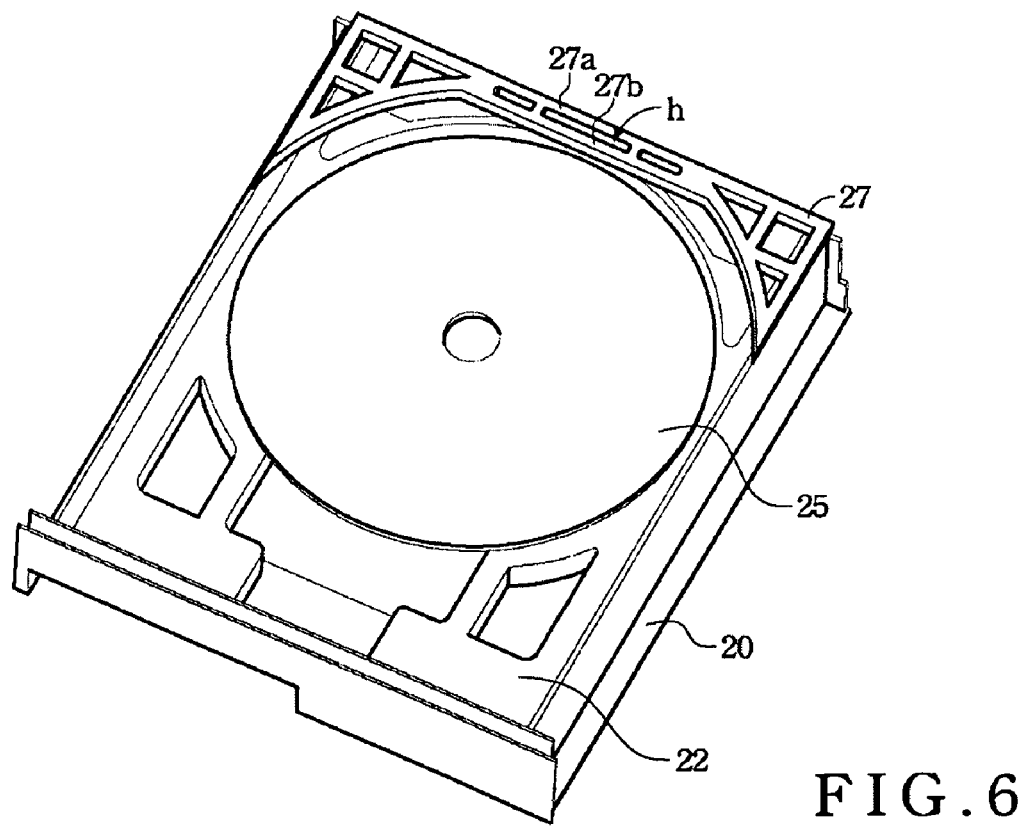
FIG. 6 shows the related structure of a double-layered retaining plate viewed from the top of the optical disk drive.

Please refer to FIG. 6, which shows the related structure of the double-layered retaining plate viewed from the top of the optical disk drive. The double-layered retaining plate 27 is a frame-shaped structure mounted on the front end of the chassis 20. In addition, the both sides of the frame-shaped structure of the double-layered retaining plate 27 are assembled directly on the both lateral sides of the chassis 20 directly. The tray 22 is located under the double-layered retaining plate 27 and it is movable to the outside of the optical disk drive via the front end of the chassis 20 so as to facilitate the user to put in or take out the optical disk 25. The first retaining plate 27a and the second retaining plate 27b of the aforementioned double-layered retaining plate 27 have a long and narrow opening h therebetween. When the aforementioned upper cover 21 is assembled to the chassis 20, the bended part 21a located on the front end of the upper cover 21 will be inserted exactly into the opening h to form the sectional structure as shown in the FIG. 4 and FIG. 5.

The present invention has considerable advantages. First, the inclined directed channel 26 that extends upward obliquely is formed between the faceplate 23 and the door 24. Therefore, when the broken disk proceeds along the gap d between the faceplate 23 and the door 24, it will be guided to go up along the inclined directed channel 26 to thereby avoid hitting the door 24 directly and perpendicularly. As a result, the inclined directed channel 26 is capable of dispersing the impact force from the broken disk and decreasing its kinetic energy so as to retain the broken disk in the inclined directed channel 26, thereby preventing the door 24 from deformation or damage and also effectively preventing the broken disk, which may hurt the user, from piercing through the door 24.

Moreover, the present invention also provides the bended part 21a of the upper cover 21 and the double-layered retaining plate 27 behind the faceplate 23 such that the soft double-layered retaining plate 27 and the rigid iron bended part 21a provide simultaneously the high-strength retaining structure and the soft structure capable of decreasing the impact force of the broken disk. Accordingly, the faceplate 23 and the door 24 can be both protected against broken disk.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An optical disk drive, comprising:
a chassis;
an upper cover mounted above the chassis;
a tray mounted between the chassis and the upper cover for supporting an optical disk;
a faceplate having a first inclined plane, and mounted on a front end of the upper cover; and
a door mounted on a front end of the tray and having a second inclined plane with a gap opposite to the first inclined plane for forming an inclined directed channel between the faceplate and the door.

2. The optical disk drive of claim 1, wherein the gap has a value from 1.0 to 1.4 cm.

3. The optical disk drive of claim 1, wherein the faceplate further comprises a first vertical surface connected with an upper edge of the first inclined plane, and the door comprises a second vertical surface opposite to the first vertical surface and connected with an upper edge of the second inclined plane.

4. The optical disk drive of claim 1, wherein a bended part is formed on the front end of the upper cover, and a space is formed between the bended part and the faceplate.

5. The optical disk drive of claim 4, further comprising a first retaining plate located in the space between the bended part and the faceplate.

6. The optical disk drive of claim 5, wherein the door further comprises a horizontal surface connected to a lower edge of the second inclined plane, and wherein a horizontal channel is formed between a lower surface of the first retaining plate and the horizontal surface to communicate with the inclined directed channel.

7. The optical disk drive of claim 6, wherein the horizontal channel has a height from 1.0 cm to 1.4 cm.

8. The optical disk drive of claim 5, further comprising a second retaining plate located behind the first retaining plate and the bended part.

9. The optical disk drive of claim 8, wherein the first retaining plate and the second retaining plate are connected to each other and integrally formed to form a double-layered retaining structure.

* * * * *